United States Patent
Nardin et al.

(10) Patent No.: US 10,651,778 B2
(45) Date of Patent: *May 12, 2020

(54) ANTENNA FOR COMMUNICATING WITH A MOTOR

(71) Applicant: Regal Beloit America, Inc., Beloit, WI (US)

(72) Inventors: Steven Albert Nardin, Fort Wayne, IN (US); Brian Lee Beifus, Fort Wayne, IN (US); Ryan Keith Stephens, Fort Wayne, IN (US); Shailesh Prabhakar Waikar, Fort Wayne, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,859

(22) Filed: Dec. 20, 2018

(65) Prior Publication Data

US 2019/0149080 A1    May 16, 2019

Related U.S. Application Data

(63) Continuation of application No. 15/436,083, filed on Feb. 17, 2017, now Pat. No. 10,187,002, which is a (Continued)

(51) Int. Cl.
*H02P 29/00* (2016.01)
*H02P 31/00* (2006.01)
(Continued)

(52) U.S. Cl.
CPC .............. *H02P 29/00* (2013.01); *G08C 17/04* (2013.01); *H01Q 1/22* (2013.01); *H01Q 7/00* (2013.01); *H02P 31/00* (2013.01); *H04B 5/00* (2013.01); *H04B 5/0031* (2013.01); *H04B 5/0056* (2013.01)

(58) Field of Classification Search
CPC ...... H01Q 7/00; H01Q 1/3291; H01Q 1/3283; B60L 2240/549; B60R 2325/105; B60R 2325/103; H02P 29/20; H02P 31/00; H02N 2/18
See application file for complete search history.

(56) References Cited

U.S. PATENT DOCUMENTS 5,903,345 A  5/1999 Butler
6,337,671 B1  1/2002 Lee
(Continued)

*Primary Examiner* — Marlon T Fletcher
(74) *Attorney, Agent, or Firm* — Armstrong Teasdale LLP

(57) ABSTRACT

An electric machine includes a motor assembly including a motor controller including an NFC tuned circuit. The electric machine also includes a motor housing defining an interior space and enclosing the motor assembly within the interior space. The electric machine further includes an electric machine housing. The motor housing is enclosed within the electric machine housing. The electric machine also includes an NFC antenna mounted within the electric machine housing and configured to emit a magnetic field at a selected frequency. The magnetic field is configured to induce an electric current in the NFC tuned circuit. The electric machine further includes a memory configured to store information included in signals transmitted between the NFC antenna and the NFC tuned circuit via the magnetic field.

20 Claims, 6 Drawing Sheets

Related U.S. Application Data continuation-in-part of application No. 14/541,798, filed on Nov. 14, 2014, now Pat. No. 9,614,475.

(51) Int. Cl.

| | | |
|---|---|---|
| *G08C 17/04* | (2006.01) | |
| *H01Q 1/22* | (2006.01) | |
| *H01Q 7/00* | (2006.01) | |
| *H04B 5/00* | (2006.01) | |

(56) References Cited

U.S. PATENT DOCUMENTS

| | | |
|---|---|---|
| 2002/0171598 A1 | 11/2002 | Mertel |
| 2004/0066335 A1 | 4/2004 | Ashjaee |
| 2005/0102883 A1* | 5/2005 | Temes .................. A01K 91/02 43/26.1 |
| 2007/0194945 A1 | 8/2007 | Atkinson |
| 2011/0029156 A1* | 2/2011 | Vernacchia .......... H04B 5/0031 701/2 |
| 2013/0030589 A1 | 1/2013 | Pessina et al. |
| 2013/0052947 A1 | 2/2013 | Kole |
| 2013/0204202 A1* | 8/2013 | Trombly ................ A61M 5/172 604/207 |
| 2014/0079564 A1 | 3/2014 | Becerra et al. |
| 2014/0210321 A1* | 7/2014 | Dixon .................... H02K 5/136 310/68 R |
| 2014/0246478 A1 | 9/2014 | Baber et al. |
| 2014/0266939 A1* | 9/2014 | Baringer ................ H01Q 21/28 343/729 |
| 2015/0107788 A1 | 4/2015 | Mullet |
| 2016/0038832 A1* | 2/2016 | Chabin ............... A63F 3/00643 463/39 |
| 2016/0072554 A1 | 3/2016 | Sharma |
| 2016/0141998 A1* | 5/2016 | Nardin .................... H01Q 7/00 318/16 |
| 2017/0047636 A1* | 2/2017 | Lee ...................... H04B 5/0031 |
| 2017/0163200 A1* | 6/2017 | Nardin .................... G08C 17/04 |

\* cited by examiner

ANTENNA FOR COMMUNICATING WITH A MOTOR

RELATED APPLICATION DATA

This application is a continuation of U.S. Nonprovisional application Ser. No. 15/436,083 filed Feb. 17, 2017, which is a continuation in part of U.S. Nonprovisional application Ser. No. 14/541,798 filed Nov. 14, 2014 and issued as U.S. Pat. No. 9,614,475, the entire contents of which are incorporated herein by reference.

BACKGROUND

The field of the invention relates generally to electric motors having electronic controls, and more particularly, to electric motors having external antennas for relaying signals to and from electronic controls.

One of many applications for an electric motor is to operate a pump or a blower. The electric motor may be configured to rotate an impeller within a pump or blower to displace fluid. Many gas burning appliances include an electric motor, for example, without limitation, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance. Typically, these electric motors are enclosed within a motor housing to protect the motor from the environment and protect people from dangerous components of the motor.

One type of motor used in such systems is an alternating current (AC) induction motor. Another type of motor that may be used in the application described above is an electronically commutated motor (ECM). ECMs include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor.

Some known electric motors require electronic controls. These electronic controls are often enclosed inside the motor housing to protect the electronic controls from the environment. Some of these electronic controls incorporate radio-based communication capabilities, such as Radio Frequency Identification (RFID), Wireless Local Area Network (WLAN), and Wireless Personal Area Network (WPAN) capabilities, for communicating with handheld devices. One type of radio-based communication system is a Near Field Communication (NFC) system. Generally, an NFC system requires at least two inductive components that generate magnetic fields. When the components' magnetic fields overlap, the components will inductively transfer their currents and, thereby, exchange signals and information.

Some known radio-based communications systems have a limited range. For example, NFC components' magnetic fields generally have a very limited range, usually no more than 10 centimeters. However, electronic controls are typically positioned in the motor housing such that the antenna signal from the antenna incorporated in the electronic controls would not reach the exterior of the housing. Additionally, the typical metal enclosure interferes with the signal. Therefore, a user has to position a handheld device inside the housing to transmit the signal to and receive a signal from an antenna, such as an NFC antenna, on a typical motor, which is both awkward and dangerous for the user. Additionally, such antennas are difficult to repair or replace since they are inside the motor assembly. Furthermore, it is expensive to retrofit a motor to add radio-based communication capabilities.

BRIEF DESCRIPTION

In one aspect, an electric machine is provided. The electric machine includes a motor assembly including a motor controller including an NFC tuned circuit. The electric machine also includes a motor housing defining an interior space and enclosing the motor assembly within the interior space. The electric machine further includes an electric machine housing. The motor housing is enclosed within the electric machine housing. The electric machine also includes an NFC antenna mounted within the electric machine housing and configured to emit a magnetic field at a selected frequency. The magnetic field is configured to induce an electric current in the NFC tuned circuit. The electric machine further includes a memory configured to store information included in signals transmitted between the NFC antenna and the NFC tuned circuit via the magnetic field.

In another aspect, an electric machine is provided. The electric machine includes a motor assembly including a motor and a motor controller coupled to the motor and configured to control operation of the motor. The motor controller includes a processor including a first memory. The electric machine also includes a motor housing defining an interior space and enclosing the motor assembly within the interior space. The electric machine further includes an NFC component including an NFC antenna and a second memory. The NFC antenna is configured to emit a magnetic field at a selected frequency. The NFC component is configured to send signals to the motor controller including information from the second memory for storage on the first memory.

In yet another aspect, an electric machine is provided. The electric machine includes a motor and a motor controller. The motor controller is coupled to the motor and configured to control operation of the motor. The motor controller includes a processor including a first memory. The electric machine also includes an NFC component including an NFC antenna and a second memory. The NFC antenna is configured to emit a magnetic field at a selected frequency. The NFC component is configured to send signals to the motor controller including information from the second memory for storage on the first memory.

DETAILED DESCRIPTION

Described below are external antennas for communicating with motors and methods of using antennas to communicate with motors. Antennas provide a simple means to communicate with and, thereby, control or configure a motor. An externally mounted antenna allows a user to communicate with the motor from a handheld device positioned outside the motor housing. A communication interface allows the antenna to communicate with the handheld device using different communication systems. In some embodiments, the antenna transmits signals between the motor and communication components mounted on a control board. In further embodiments, the antenna is coupled to a static random access memory and configured to rewrite memory of a processor of the motor.

Figure 1:
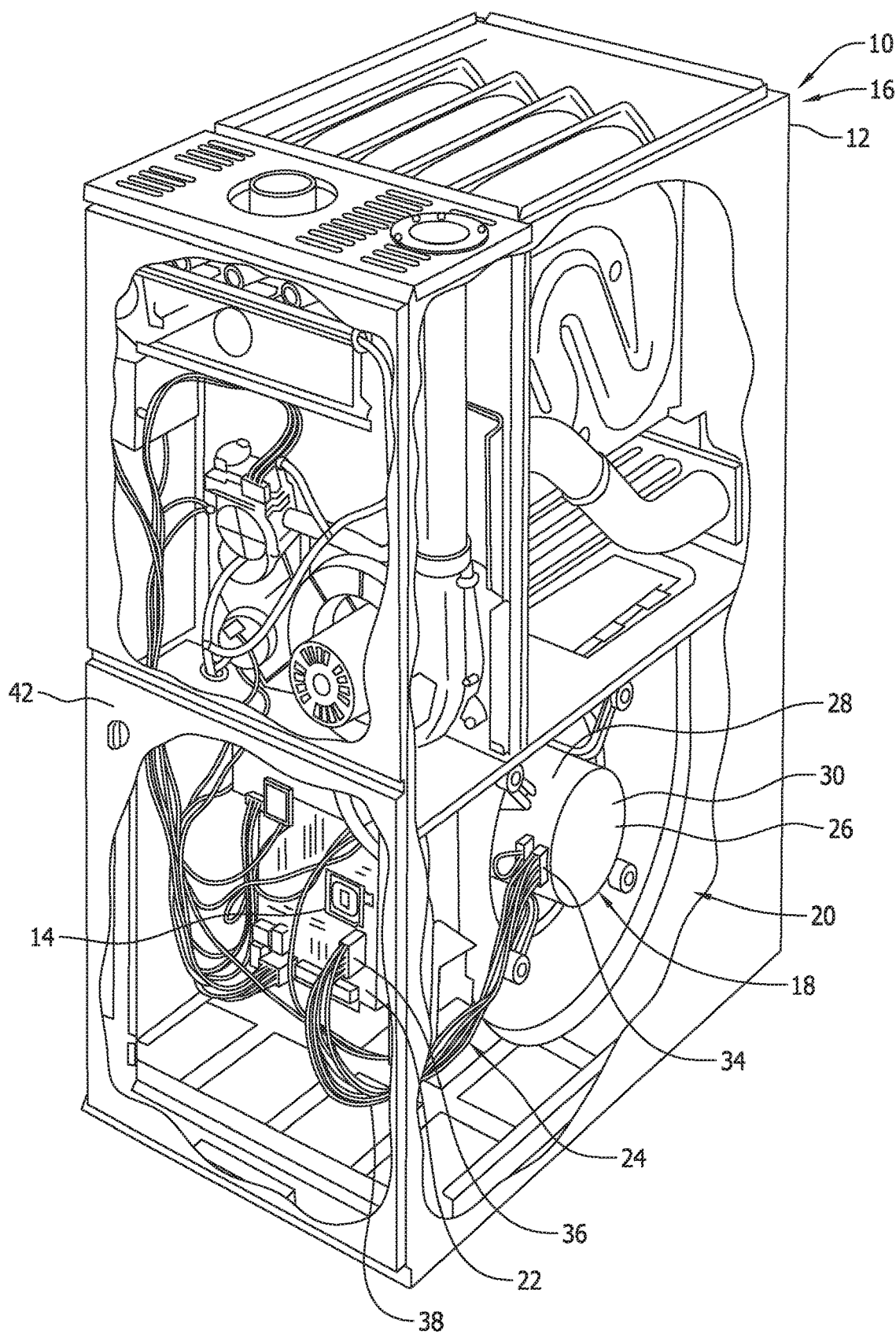
FIG. 1 is a perspective view of an exemplary electric machine with sections of an exterior housing removed to show an exemplary antenna.

FIG. 1 is a perspective view of an exemplary electric machine 10 with sections of an exterior housing 12 removed to show an antenna 14. In the exemplary embodiment, electric machine 10 is a heating, ventilation, and air conditioning (HVAC) unit 16 comprising housing 12, a motor assembly 18, a blower assembly 20, a control board 22, and transmission lines 24. In alternative embodiments, electric machine 10 is any type of motorized machine. In the exemplary embodiment, motor assembly 18 drives a fan (not shown) of blower assembly 20 to draw air into, through, and out of HVAC unit 16 for distribution in an HVAC system (not shown).

Motor assembly 18 includes a motor housing 26 having a motor enclosure 28 and a control enclosure 30. Control enclosure 30 encloses motor controller 32 (shown in FIG. 2). Transmission lines 24 extend from control enclosure 30 to control board 22. Motor assembly 18 is coupled to a first end 34 of transmission lines 24 and control board 22 is coupled to a second end 36 of transmission lines 24. Transmission lines 24 include a link 38, which connects motor assembly 18 to input/output (I/O) components, broadly communication components, 40 on control board 22. In addition, link 38 connects motor assembly 18 to antenna 14. Thus, link 38 is a shared connection reducing the material and labor necessary for assembling motor assembly 18. In alternative embodiments, link 38 extends to other components of motor assembly 18 and/or other components of electric machine 10, for example, without limitation, a second motor (not shown). In further alternative embodiments, link 38 comprises a power line 221 (shown in FIG. 5) for supplying power from an external power source 224 (shown in FIG. 5) to motor assembly 18, in addition to coupling antenna 14 to motor assembly 18. Alternatively, link 38 exclusively connects antenna 14 to motor assembly 18.

In the exemplary embodiment, link 38 includes a pair of insulated transmission wires (not shown). Transmission wires are any wires suitable for transmitting a signal as described herein, e.g., a twisted pair of wires or coaxial wires. Alternatively, link 38 is any component suitable for connecting antenna 14 to motor assembly 18 as described herein. In the exemplary embodiment, link 38 facilitates reducing manufacturing costs since an additional circuit does not need to be added for antenna 14. Additionally, link 38 facilitates placing antenna 14 on control board 22. In alternative embodiments, antenna 14 is mounted separately from control board 22.

Antenna 14 includes a looped wire configured to transmit radio signals when current flows through the looped wire. In alternative embodiments, antenna 14 is any size, shape, and configuration suitable for functioning as described herein. For example, antenna 14 can be any tuned circuit configured to transmit radio signals in any radio-based communication system including, but not limited to, Radio Frequency Identification (RFID), Wireless Local Area Network (WLAN), and Wireless Personal Area Network (WPAN) systems. In the exemplary embodiment, antenna 14 generates a magnetic field when it vibrates at a selected frequency. Specifically, antenna 14 vibrates at a frequency of about 13.56 MHz and, thus, is suitable for use in a Near Field Communication (NFC) system. In alternative embodiments, antenna 14 vibrates at any frequency.

In the exemplary embodiment, antenna 14 transmits radio signals to and receives signals from components, such as inductive components used in NFC systems. In NFC systems, at least one NFC component generates a magnetic field to inductively transfer currents and, thereby, exchange signals and information with other NFC components positioned within the magnetic field. In the exemplary embodiment, antenna 14 acts as an NFC component to send and receive signals. Antenna 14 will transmit radio signals to NFC components positioned within the magnetic field of antenna 14. Therefore, the magnetic field generated by antenna 14 defines the antenna range of antenna 14. In the exemplary embodiment, antenna 14 has an antenna range of approximately 10 centimeters. Additionally, in the exemplary embodiment, antenna 14 receives radio signals from NFC components when antenna 14 is positioned within the magnetic field of the NFC components. The NFC components' magnetic fields generally have a very limited range, usually no more than 10 centimeters.

In the exemplary embodiment, antenna 14 is mounted on control board 22 such that a user can position a hand held device, e.g. a smart phone, within the antenna range. Ideally, control board 22 and antenna 14 are positioned such that the antenna range extends outside housing 12. For example, antenna 14 is positioned less than 10 cm from the exterior of housing 12. In the exemplary embodiment, housing 12 includes a panel 42 that is removed to expose control board 22 and antenna 14. Removal of panel 42 facilitates the positioning of the hand held device in the antenna range of antenna 14. In alternative embodiments, antenna 14 is positioned anywhere exterior to motor assembly 18, including any positions interior or exterior of housing 12. In the exemplary embodiment, antenna 14 is positioned between about 60 cm and about 92 cm from control enclosure 30.

Figure 2:
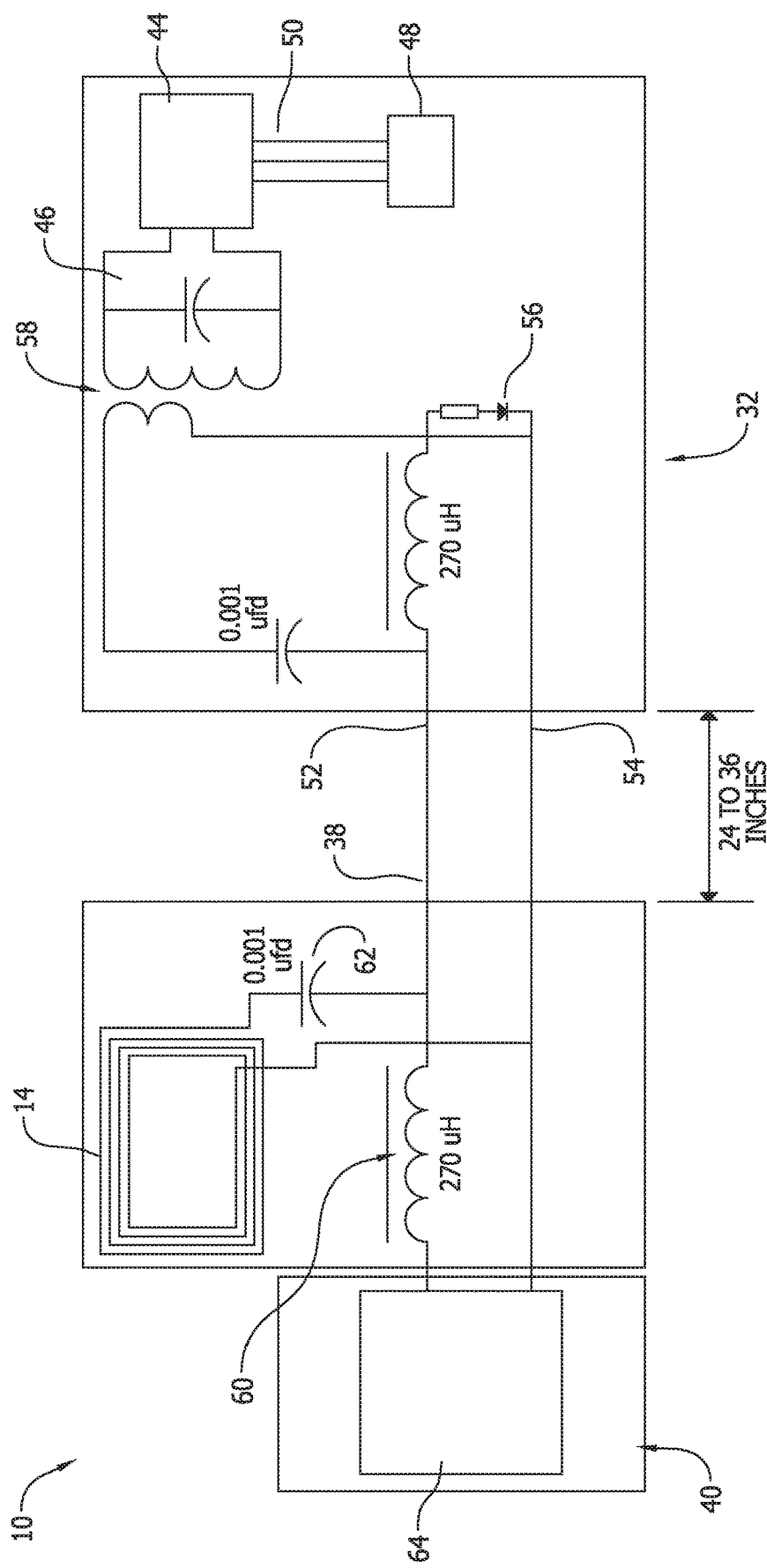
FIG. 2 is a schematic wiring diagram of the exemplary antenna connected to the electric machine shown in FIG. 1.

FIG. 2 is a schematic wiring diagram of electric machine 10. Motor controller 32 includes an NFC electrically erasable programmable read-only memory (EEPROM) 44, an NFC tuned circuit 46, and a microprocessor 48. In alternative embodiments, any antenna suitable for functioning as described herein is swapped for NFC tuned circuit 46. In the exemplary embodiment, a serial peripheral interface bus (SPI Bus) 50 connects NFC EEPROM 44 to microprocessor 48. In alternative embodiments, a standard EEPROM (not shown), without NFC capabilities, is swapped for NFC EEPROM 44. In the exemplary embodiment, link 38 includes an RX line 52, a common line 54, optical isolation components 56, and a coupling link 58. Coupling link 58 facilitates coupling NFC tuned circuit 46 with other components for relaying signals to and from NFC tuned circuit 46. Coupling link 58 is any coupling component suitable for functioning as described herein, e.g., a magnetic or capacitive coupling component. In the exemplary embodiment, RX line 52 includes an inductor 60 and a capacitor 62 for isolating antenna 14 from voltage in RX line 52. By isolating antenna 14, capacitor 62 facilitates antenna 14 being coupled to common line 54 without shorting out the circuit and/or creating safety issues. Antenna 14 and a control board 64 are coupled to RX line 52 and common line 54. In alternative embodiments where link 38 is dedicated to antenna 14 and free from coupling with other components, capacitor 62 is unnecessary.

Figure 3:
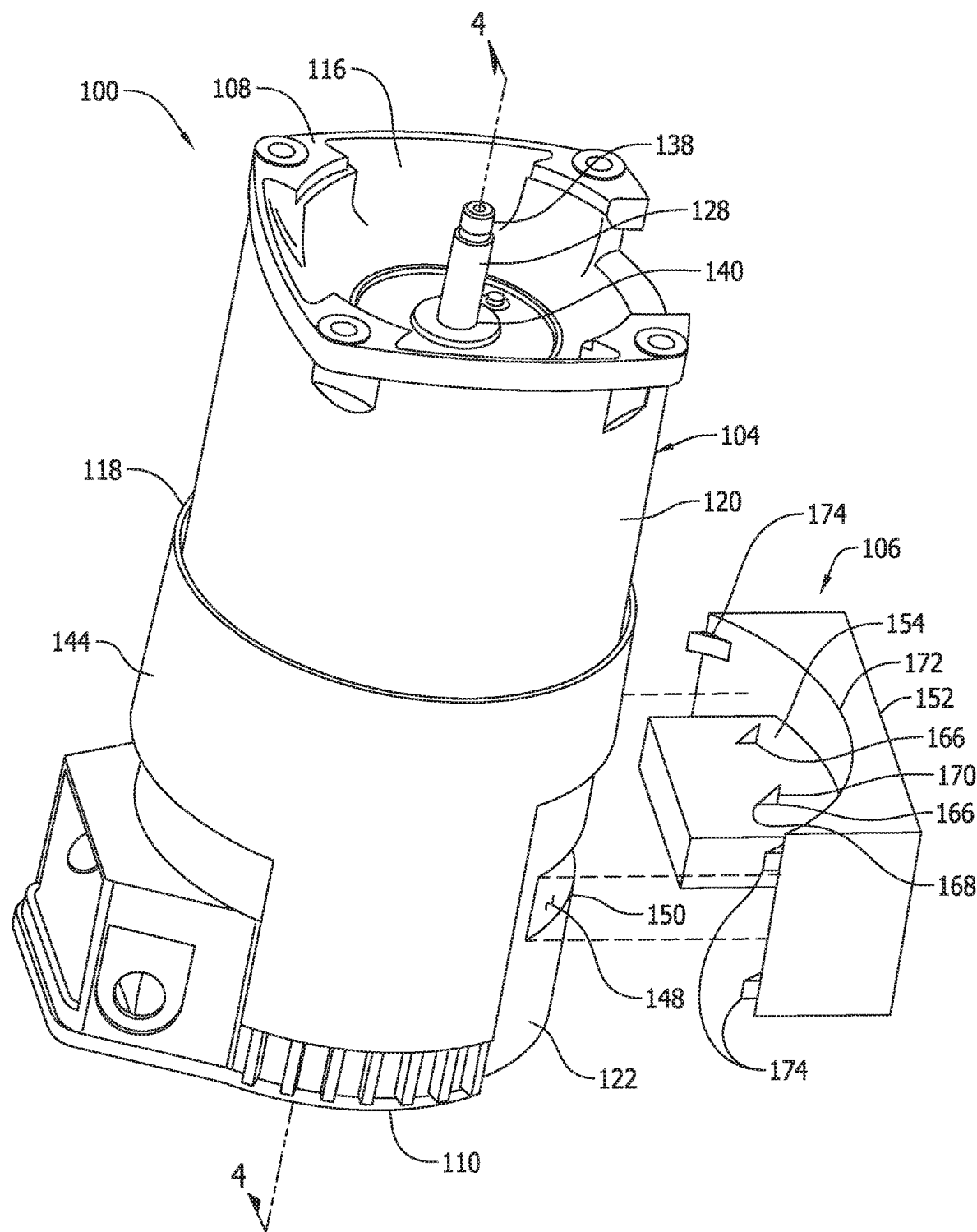
FIG. 3 is a perspective view of an exemplary electric motor including an exemplary antenna.
Figure 4:
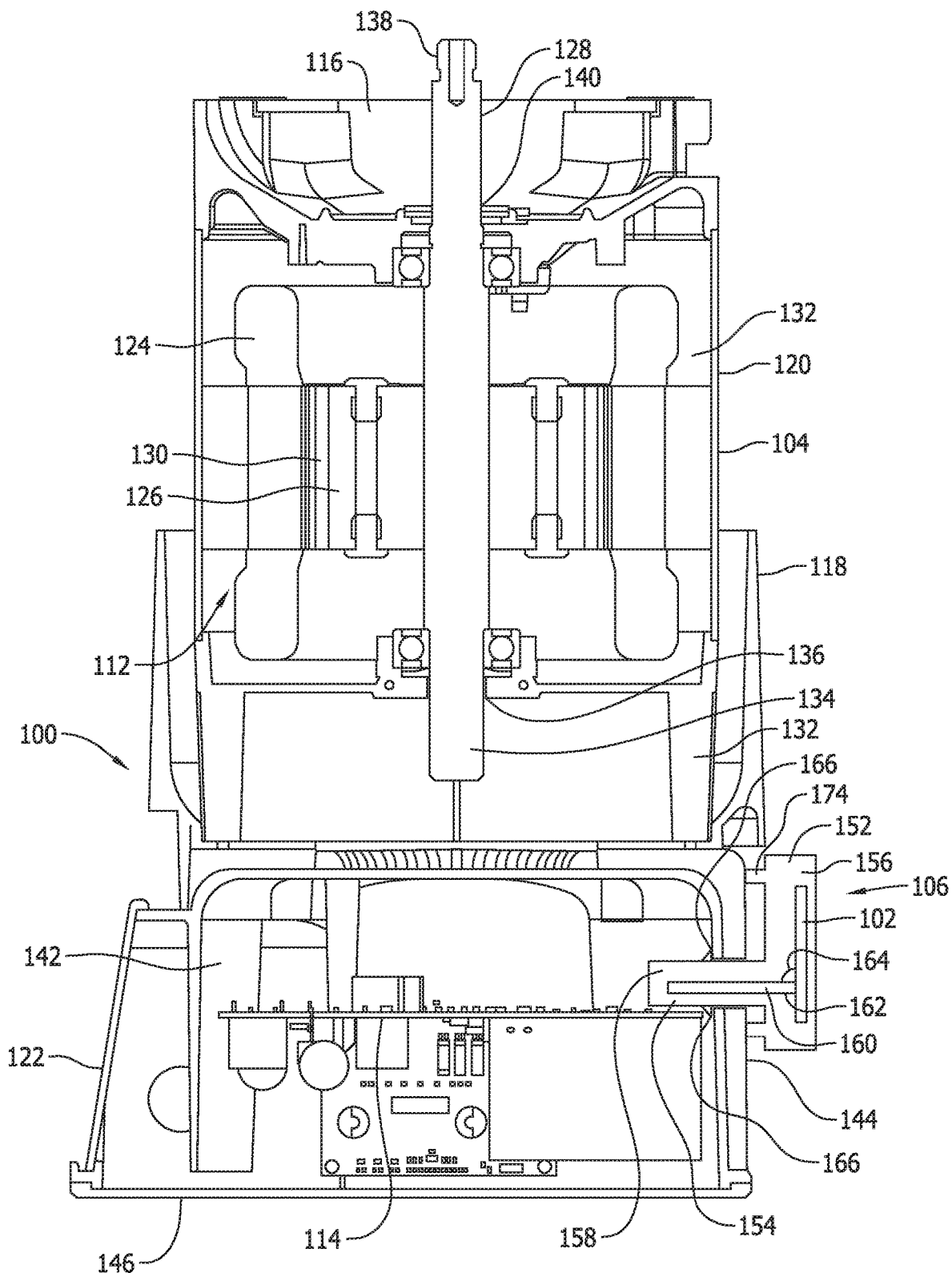
FIG. 4 is a cross-sectional view of the electric motor shown in FIG. 3 taken along line 4-4 with the exemplary antenna coupled to a motor housing.

FIG. 3 is a perspective view of an exemplary electric motor 100 including an antenna 102. FIG. 4 is a cross-sectional view of electric motor 100 taken along line 4-4 with antenna 102 coupled to a motor housing 104. Antenna 102 is similar to antenna 14 shown in FIGS. 1 and 2 except antenna 102 is positioned in an antenna enclosure 106.

In the exemplary embodiment, electric motor 100 generally includes motor housing 104, a motor assembly 112, and an electronics control 114. Motor housing 104 is defined by an adaptor plate 116, a shroud 118, a motor enclosure 120, and an electronics enclosure 122. Motor assembly 112 generally includes a stator 124 and a rotor 126 coupled to a shaft 128. A plurality of permanent magnets 130 are coupled to rotor 126 in any suitable configuration that enables motor assembly 112 to function as described herein. In the exemplary embodiment, stator 124 is oriented adjacent rotor 126 in an axial flux configuration. Alternatively, stator 124 is oriented at least partially surrounding rotor 126 in a radial flux configuration. In the exemplary embodiment, rotor 126 is rotatable within motor housing 104 and, more specifically, rotor 126 is rotatable within motor enclosure 120. Rotor 126 is driven by stator 124, which is controlled by electronics control 114. In some embodiments, electronics control 114 acts as a sinusoidal or trapezoidal electronics control for stator 124.

In the exemplary embodiment, motor enclosure 120 defines an inner cavity 132. Motor assembly 112 is mounted within inner cavity 132. A shaft first end 134 extends through an aperture 136 defined in motor enclosure 120 and a shaft second end 138 extends through an aperture 140 defined in adaptor plate 116. Adaptor plate 116 facilitates attachment of electric motor 100 to a system (not shown) to be driven by shaft 128.

In the exemplary embodiment, electronics enclosure 122 is coupled to an end of motor enclosure 120. Electronics enclosure 122 includes an inner cavity 142 defined by a sidewall 144 and an end cover 146. Electronics control 114 is mounted within electronics enclosure 122 and facilitates control of motor assembly 112. Sidewall 144 defines a rectangular-shaped opening 148 that receives a portion of antenna enclosure 106. Alternatively, opening 148 has any suitable shape that enables opening 148 to function as described herein. When antenna enclosure 106 is not positioned in opening 148, a patch 150 covers opening 148. Patch 150 is a plastic sheet with an adhesive backing for coupling to sidewall 144 around opening 148 such that patch 150 completely covers opening 148. In alternative embodiments, patch 150 is made of any material, e.g., metal, and is coupled to sidewall 144 in any suitable manner, e.g., rivets and/or welds. In further embodiments, patch 150 covers only a portion of opening 148. For example, in some embodiments, patch 150 covers portions of opening 148 not filled by antenna enclosure 106 when antenna enclosure 106 is inserted in opening 148.

In the exemplary embodiment, antenna enclosure 106 has an isolation compartment 152 and a link compartment 154. Isolation compartment 152 defines an antenna cavity 156 for receiving antenna 102. Antenna 102 removably couples inside antenna cavity 156. In the exemplary embodiment, antenna enclosure 106 is made substantially of nonconductive material, such as plastic and/or rubber, such that antenna 102 is isolated from electrical charges in conductive material that contacts isolation compartment 152. Additionally, the nonconductive material minimizes interference with the antenna range. In alternative embodiments, antenna enclosure 106 is made of any suitable material or combinations of materials that allow antenna enclosure 106 to function as described herein.

In the exemplary embodiment, link compartment 154 defines a link cavity 158 for receiving a link component 160. Link component 160 is any component that enables antenna 102 to link with electronics control 114. In the exemplary embodiment, link component 160 is a circuit board 162 coupled with antenna 102 by a wire 164. Link compartment 154 and isolation compartment 152 are configured such that circuit board 162 and antenna 102 are positioned in planes approximately perpendicular to each other, i.e., planes that form a 90° angle. In alternative embodiments, antenna 102 and circuit board 162 are positioned in the same plane or in planes forming any angles. In the exemplary embodiment, circuit board 162 intersects antenna 102 between distal ends of antenna 102 and offset from the center of antenna 102.

The position of link compartment 154 in relation to isolation compartment 152 facilitates inserting a portion of link compartment 154 in opening 148. When inserted in opening 148, link compartment 154 extends partially into electronics enclosure 122 such that a portion of circuit board 162 is aligned with a portion of electronics control 114. Specifically, in the exemplary embodiment, circuit board 162 is aligned with an NFC tuned circuit component or antenna (not shown) of electronics control 114. The aligned circuit board 162 and electronics control 114 couple together for relaying signals between the two. The coupling between circuit board 162 and electronics control 114 acts as a wireless link, i.e., circuit board 162 links to electronics control 114 without transmission lines. Accordingly, antenna 102 is capable of coupling to a motor that does not have transmission lines running to an I/O board (not shown).

Link compartment 154 has a rectangular cuboid shape and is slightly smaller in cross section than opening 148, thus, link compartment 154 fits easily into opening 148. In alternative embodiments, link compartment 154 has any size and shape suitable for functioning as described herein. Antenna enclosure 106 further includes retention snaps 166 for securing antenna enclosure 106 to electronics enclosure 122. Retention snaps 166 are, in one embodiment, flexible wedge shaped protrusions disposed on the exterior of link compartment 154 comprising a leading end 168 and a back end 170. The space between retention snaps 166 and link compartment 154 increases from a minimum space at leading end 168 to a maximum space at back end 170. The minimum space at leading end 168 is less than the clearance of opening 148 around link compartment 154. Therefore, as link compartment 154 is inserted into opening 148, an edge 172 surrounding opening 148 contacts retention snaps 166 at a point between leading end 168 and back end 170. Edge 172 then compresses retention snaps 166 against link compartment 154. Once link compartment 154 is inserted such that retention snaps 166 pass beyond edge 172, retention snaps 166 return to their original wedge shape spaced from link compartment 154. After insertion of link compartment 154, back end 170 is closer to edge 172 than leading end 168 is to edge 172. Since the maximum space at back end 170 is greater than the clearance of opening 148 around link compartment 154, retention snaps 166 will not compress if link compartment 154 is pulled out of opening 148. Thus, retention snaps 166 prevent withdrawal of link compartment 154. In alternative embodiments, antenna enclosure 106 secures to electronics enclosure 122 by any suitable means, e.g., welds, screws, magnets, and/or adhesives.

In the exemplary embodiment, isolation compartment 152 has a curved wall 174 that substantially matches the curvature of electronics enclosure 122. Spacers 176 extend from curved wall 174 to isolate isolation compartment 152 from the exterior of electronics enclosure 122. Spacers 176 and curved wall 174 stabilize isolation compartment 152 against electronics enclosure 122.

An exemplary method of using antenna 102 to control electric motor 100 is described herein. Electric motor 100 generally includes motor housing 104, motor assembly 112, and electronics control 114. Motor housing 104 includes motor enclosure 120 containing motor assembly 112 and electronics enclosure 122 containing electronics control 114. Electronics control 114 includes I/O components 40 and NFC EEPROM 44. Alternatively, a motor without I/O components 40 and/or NFC EEPROM 44 is provided.

The exemplary method includes positioning antenna 102 within isolation compartment 152 of antenna enclosure 106. In alternative methods, antenna 102 is not positioned in an antenna enclosure. The exemplary method includes coupling antenna enclosure 106 directly to the exterior of motor housing 104. In alternative methods, antenna 102 is mounted anywhere external of motor housing 104, e.g. on housing 12. The exemplary method further includes positioning spacers 176 between isolation compartment 152 and motor housing 104. Link compartment 154 containing circuit board 162 is inserted at least partially into motor housing 104. Circuit board 162 is aligned with electronics control 114 to link antenna 102 with electronics control 114 through circuit board 162. In alternative methods, antenna 102 is linked with electronics control 114 in any suitable manner, e.g., coupling link 38 between antenna 102 and electronics control 114. Alternative methods further include connecting capacitor 62 to link 38 such that antenna 102 is isolated from direct current running through link 38. In the exemplary method, a signal is sent from a handheld device (not shown) to antenna 102. The signal is relayed from antenna 102 to electronics control 114 through circuit board 162. The exemplary method further includes relaying information from electronics control 114, such as specifications and diagnostics of electric motor 100, through antenna 102 and receiving the information on the handheld device.

Figure 5:
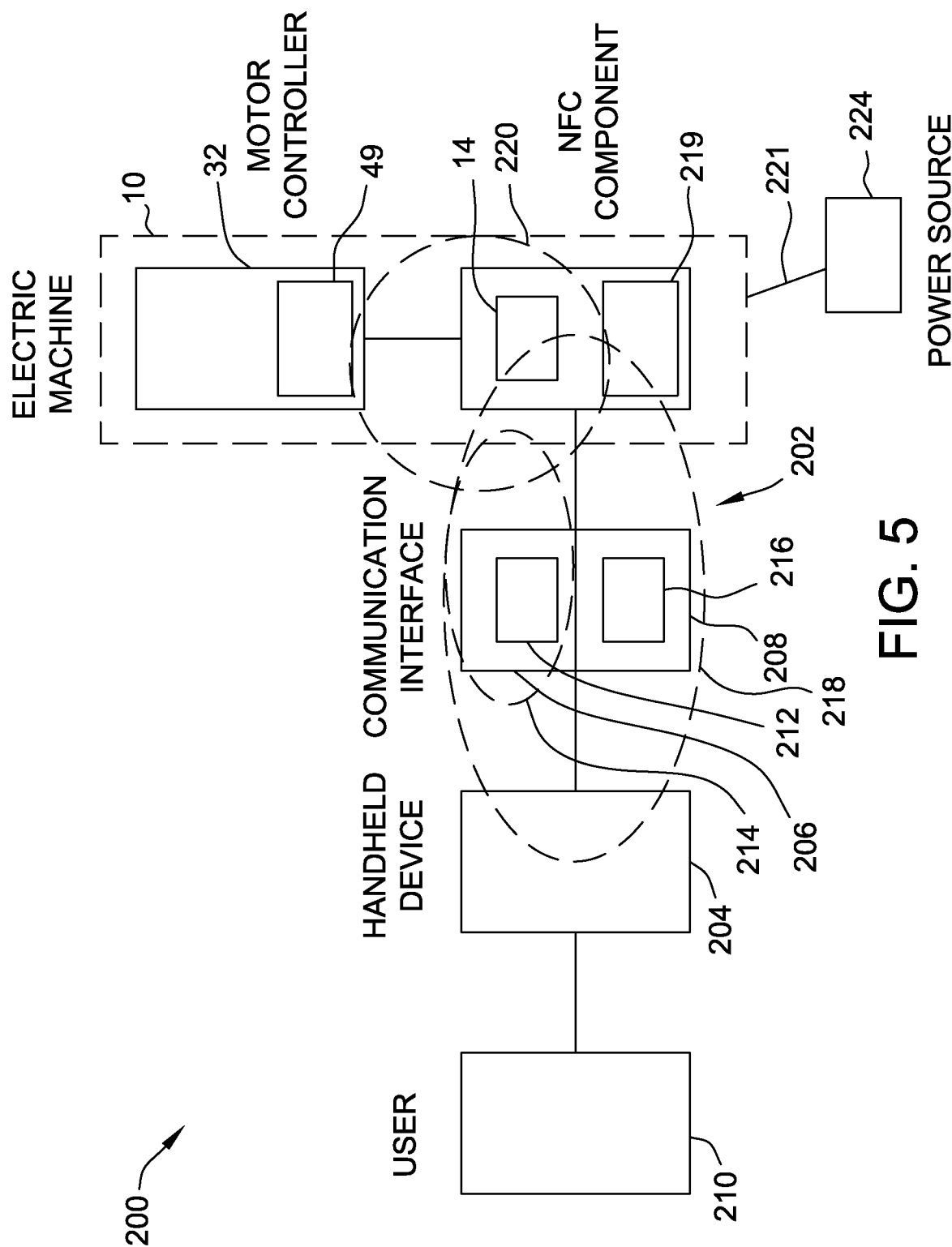
FIG. 5 is a schematic view of a system for communicating with the electric machine shown in FIG. 1.

FIG. 5 is a schematic view of a system 200 for communicating with electric machine 10. System 200 includes a communication interface 202 and a handheld device 204. Communication interface 202 includes an NFC component 206 and a radio component 208. Communication interface 202 facilitates a user 210 communicating with electric machine 10 using handheld device 204. In particular, communication interface 202 relays signals between electric machine 10 and handheld device 204. In alternative embodiments, system 200 has any configuration that enables system 200 to operate as described herein.

In the exemplary embodiment, NFC component 206 includes an antenna 212 configured to generate a magnetic field 214 when antenna 212 vibrates at a selected frequency. Specifically, in the exemplary embodiment, antenna 212 vibrates at a frequency of about 13.56 MHz and, thus, is suitable for use in an NFC system. In alternative embodiments, NFC component 206 includes any antenna that enables system 200 to operate as described herein.

In addition, in the exemplary embodiment, radio component 208 includes an antenna 216 configured to transmit radio signals. For example, antenna 216 includes a looped wire configured to generate a magnetic field 218 when antenna 216 vibrates at a selected frequency. In some embodiments, antenna 216 is any tuned circuit configured to transmit radio signals in any radio-based communication system including, but not limited to, Radio Frequency Identification (RFID), Wireless Local Area Network (WLAN), and Wireless Personal Area Network (WPAN) systems. In alternative embodiments, radio component 208 includes any antenna that enables system 200 to operate as described herein.

Moreover, in the exemplary embodiment, antenna 212 is configured such that magnetic field 214 overlaps with a magnetic field 220 of antenna 14. Accordingly, antenna 212 is configured to transmit signals to and receive signals from antenna 14. In addition, magnetic field 218 is accessible to handheld device 204. Antenna 216 is configured to transmit signals to and receive signals from handheld device 204 when handheld device 204 is positioned within range of magnetic 214. In the exemplary embodiment, magnetic field 218 is larger than magnetic field 214 and magnetic field 220. Accordingly, antenna 216 has a greater range than antenna 14 and antenna 212. In alternative embodiments, system 200 includes any magnetic fields that enable system 200 to operate as described herein.

Also, in the exemplary embodiment, antenna 216 and antenna 212 are configured to operate at different frequencies. Accordingly, NFC component 206 and radio component 208 operate in different communication systems. For example, in the exemplary embodiment, antenna 212 exchanges signals with components of an NFC system and antenna 216 exchanges signals with components of a different radio-based communication system. Accordingly, communication interface 202 allows handheld devices 204 to communicate with electric machine 10 using communication systems other than NFC systems. For example, some handheld devices 204 are configured to communicate with communication interface 202 in radio-based communication systems including, but not limited to, RFID, WLAN, and WPAN systems.

Also, in the exemplary embodiment, communication interface 202 is mounted adjacent electric machine 10. In some embodiments, communication interface 202 is mounted to a portion of electric machine 10 such as housing 12 (shown in FIG. 1). In further embodiments, communication interface 202 is mounted to a support structure adjacent electric machine 10 such as a wall and/or a frame. The position of communication interface 202 facilitates communication interface 202 communicating with antenna 14 and handheld device 204. In alternative embodiments, communication interface 202 is mounted in any manner that enables system 200 to operate as described herein. For example, in some embodiments, communication interface 202 is integrated into electric machine 10.

During operation, communication interface 202 relays signals between antenna 14 and handheld device 204. Specifically, antenna 212 receives NFC signals from antenna 14 and the NFC signals are translated to radio signals at a different radio frequency. Antenna 216 transmits the radio signals to handheld device 204 and/or any other suitable radio component within range of antenna 216. In some embodiments, handheld device 204 displays information from the signals on a display for user 210. User 210 interprets the information and/or uses handheld device 204 to adjust operating parameters of electric machine 10. To send signals to electric machine 10, handheld device 204 transmits radio signals relating to user commands to communication interface 202 for relaying to electric machine 10. Specifically, antenna 216 receives the radio signals from handheld device 204 and the radio signals are translated to NFC signals. Antenna 212 transmits the NFC signals to antenna 14. Antenna 14 receives the NFC signals and sends signals to motor controller 32 for interpretation. In some embodiments, motor controller 32 adjusts operation of electric machine 10 based on the signals. In alternative embodiments, components of system 200 transmit any signal that enables system 200 to operate as described herein. In some embodiments, the signals are automatic, i.e., not necessarily initiated by user 210. In further embodiments, signals are transferred between handheld device 204, communication interface 202, and/or antenna 14 in only one direction. In some embodiments, communication interface 202 is omitted or bypassed and handheld device 204 communicates directly with electric machine 10.

In some embodiments, antenna 14, antenna 212, and/or antenna 216 transmit signals relating to at least one operational parameter of electric machine 10. For example, in some embodiments, the signals relate to a temperature and/or rotational speed of motor assembly 112 (shown in FIG. 1). Accordingly, system 200 facilitates user 210 receiving diagnostic data and/or controlling electric machine 10. Moreover, antenna 14 and/or communication interface 202 facilitate user 210 communicating with electric machine 10 using handheld device 204. In some embodiments, signals are provided in real-time during operation of electric machine 10. Accordingly, user 210 is able to diagnose issues and make adjustments in real-time. For example, in some embodiments, user 210 adjusts an operating parameter of electric machine 10, such as a temperature, during operation of electric machine 10 and receives information relating to the operation of electric machine 10 in real-time. Moreover, in some embodiments, user 210 adjusts operation of electric machine 10 using handheld device 204 while remaining in the proximity of electric machine 10 and without having to use a remote controller such as a thermostat.

In the exemplary embodiment, antenna 14 is coupled to a memory 219. Antenna 14 and memory 219 form an NFC component 222. In some embodiments, memory 219 includes a static random access memory (SRAM). NFC component 222 is configured to transfer information from memory 219 to microprocessor 48 (shown in FIG. 2) of controller 32. In some embodiments, memory 49 includes a random access memory (RAM). During operation, the information from memory 219 is stored on memory 49. In addition, in some embodiments, NFC component 222 overwrites or erases information on memory 49, i.e., NFC component 222 "flashes" processor 48. In some embodiments, NFC component 222 receives power from power source 224 to increase the speed of the information transfer. In further embodiments, NFC component 206 transfers information to processor 48 without power from power source 224.

Figure 6:
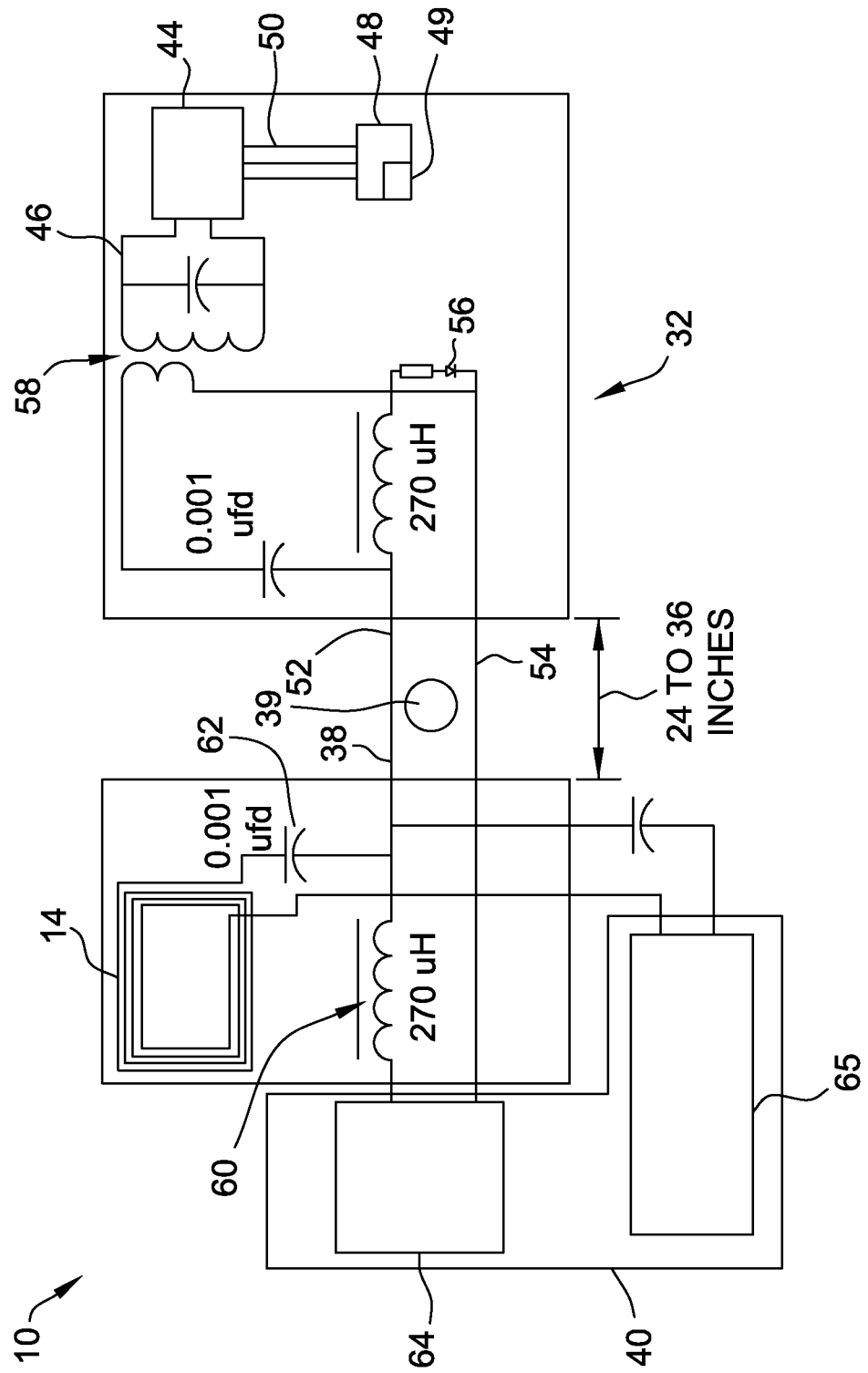
FIG. 6 is a schematic wiring diagram of another configuration of the electric machine shown in FIG. 1.

FIG. 6 is a schematic wiring diagram of another configuration of electric machine 10. Electric machine 10 includes controller 32 including NFC electrically erasable programmable read-only memory (EEPROM) 44, NFC tuned circuit 46, and a microprocessor 48. In alternative embodiments, any antenna suitable for functioning as described herein is swapped for NFC tuned circuit 46. In the exemplary embodiment, serial peripheral interface bus (SPI Bus) 50 connects NFC EEPROM 44 to microprocessor 48, which includes memory 49. In alternative embodiments, motor controller 32 includes any component that enables electric machine 10 to operate as described herein.

In the exemplary embodiment, link 38 couples antenna 14 to NFC tuned circuit 46. A filter 39 is coupled to link 38. For example, filter 39 removes interference and regulates voltage in link 38 to facilitate antenna 14 transmitting signals through link 38. In some embodiments, filter 39 includes, for example and without limitation, a common mode filter and/or a band pass filter. In the exemplary embodiment, filter 39 is mounted to control board 22 (shown in FIG. 1). In alternative embodiments, link 38 includes any filter that enables electric machine 10 to operate as described herein.

In addition, antenna 14 is coupled to input/output (I/O) components, broadly communication components, 40 by a circuit 65. Circuit 65 includes a switch to regulate signals between I/O components 40 and antenna 14. In some embodiments, I/O components 40 use antenna 14 to send signals to and/or receive signals from motor controller 32. Specifically, antenna 14 exchanges signals with NFC tuned circuit 46. Because of the NFC capabilities of antenna 14, antenna 14 increases the speed of signals between I/O components 40 and motor controller 32. In some embodiments, antenna 14 acts as a supplemental or additional I/O system. In other embodiments, other I/O systems are omitted and antenna 14 acts as the I/O system of electric machine 10.

Described herein are systems and methods for communicating with an electric motor such as a motor or a generator through an antenna. The antenna allows a user to communicate with the motor from a handheld device positioned outside the motor housing. A communication interface allows the antenna to communicate with the handheld device using different communication systems. In some embodiments, the antenna transmits signals between the motor and communication components mounted on a control board. In further embodiments, the antenna is coupled to a static random access memory and configured to rewrite memory of a processor of the motor.

Some embodiments described herein relate to electric motors including electric motors and electronic controls. However, the methods and apparatus are not limited to the specific embodiments described herein, but rather, components of apparatus and/or steps of the methods may be utilized independently and separately from other components and/or steps described herein. For example, the methods may also be used in combination with any motor, and are not limited to practice with the electric motors as described herein. In addition, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

What is claimed is:

1. An electric machine comprising:
a motor assembly including a motor controller including an NFC tuned circuit;
a motor housing defining an interior space and enclosing said motor assembly within the interior space;
an electric machine housing, said motor housing enclosed within said electric machine housing;
an NFC antenna mounted within said electric machine housing and configured to emit a magnetic field at a selected frequency, wherein the magnetic field is configured to induce an electric current in said NFC tuned circuit; and
a memory configured to store information included in signals transmitted between said NFC antenna and said NFC tuned circuit via the magnetic field.

2. The electric machine in accordance with claim 1, wherein said memory is a first memory, and wherein said motor controller includes a processor including said first memory.

3. The electric machine in accordance with claim 2, further comprising a second memory coupled to said NFC antenna, wherein said NFC antenna is configured to send signals to said motor controller including information from said second memory for storage on said first memory.

4. The electric machine in accordance with claim 1 further comprising an NFC component including said NFC antenna and said memory, wherein said NFC component is configured to send signals to said motor controller including information from said memory.

5. The electric machine in accordance with claim 1, wherein said NFC antenna is mounted on a control board.

6. The electric machine in accordance with claim 5, wherein said control board includes a circuit electrically coupled to said NFC antenna.

7. The electric machine in accordance with claim 5 further comprising:
a link extending between said NFC antenna and said motor controller, said link coupled to both said NFC antenna and said motor controller; and
a filter coupled to said link, wherein said filter is configured to regulate signals transmitted through said link.

8. The electric machine in accordance with claim 7, wherein said filter is mounted to said control board.

9. The electric machine in accordance with claim 7, wherein said filter includes at least one of a common mode and a band pass filter.

10. An electric machine comprising:
a motor assembly including:
a motor; and
a motor controller coupled to said motor and configured to control operation of said motor, said motor controller including a processor including a first memory;
a motor housing defining an interior space and enclosing said motor assembly within the interior space; and
an NFC component including an NFC antenna and a second memory, said NFC antenna configured to emit a magnetic field at a selected frequency, wherein said NFC component is configured to send signals to said motor controller including information from said second memory for storage on said first memory.

11. The electric machine in accordance with claim 10, wherein said second memory includes a static random access memory.

12. The electric machine in accordance with claim 11, wherein said first memory includes a random access memory.

13. The electric machine in accordance with claim 11, wherein said NFC component is further configured to erase information on said first memory.

14. The electric machine in accordance with claim 11, further comprising a power source coupled to said NFC component, wherein said NFC component is configured to transfer information to said first memory when said power source supplies power to said NFC component.

15. The electric machine in accordance with claim 10, wherein said NFC antenna is configured to send the signals during operation of said motor assembly, wherein the signals relate to at least one operational parameter of said motor assembly.

16. The electric machine in accordance with claim 10, wherein said NFC component is configured to receive a signal relating to a user command from a handheld device and relay the signal to said motor controller, said motor controller configured to adjust operation of said motor based at least partially on said user command.

17. A method of using an NFC antenna to communicate with a motor, the method comprising:
emitting a magnetic field at a selected frequency using the NFC antenna, wherein the magnetic field is configured to induce an electric current in an NFC tuned circuit of a motor controller connected to the motor;
transmitting signals between the NFC antenna and the motor controller via the magnetic field, wherein the signals include information for storage on a memory coupled to the NFC tuned circuit of the motor controller; and
storing the information on the memory.

18. The method in accordance with claim 17, wherein the memory is a first memory and is coupled to the motor controller, and wherein transmitting the signals between the NFC antenna and the motor controller via the magnetic field comprises transmitting signals between the NFC antenna and the motor controller via the magnetic field, wherein the signals include information from a second memory coupled to the NFC antenna for storage on the first memory.

19. The method in accordance with claim 17 further comprising erasing previously stored information on the memory when storing the information from the signals.

20. The method in accordance with claim 17 further comprising providing power to NFC antenna, wherein the NFC antenna is configured to transfer information to the memory when the power is provided to the NFC antenna.

* * * * *